United States Patent [19]

Nettleton et al.

[11] Patent Number: 5,336,899

[45] Date of Patent: Aug. 9, 1994

[54] ADJUSTABLE NEAR INFRARED RANGEFINDER ILLUMINATOR

[75] Inventors: John E. Nettleton, Fairfax Station; Dallas N. Barr, Woodbridge; Brian C. Redman, Alexandria, all of Va.

[73] Assignee: The United States of America as represented by the Secretary of the Army, Washington, D.C.

[21] Appl. No.: 980,088

[22] Filed: Nov. 24, 1992

[51] Int. Cl.⁵ .............................................. G01N 21/86
[52] U.S. Cl. .................................... 250/561; 250/333; 356/5
[58] Field of Search ................ 250/561, 221, 214 VT, 250/330, 333; 356/359, 238, 4, 5; 313/388

[56] References Cited

U.S. PATENT DOCUMENTS

| | | | |
|---|---|---|---|
| 3,644,043 | 2/1972 | Jones et al. | 356/5 |
| 3,971,932 | 7/1976 | Sewell et al. | 250/214 VT |
| 4,151,415 | 4/1979 | Lipke | 250/333 |
| 4,721,852 | 1/1988 | Muller | 250/483.1 |
| 4,788,441 | 11/1988 | Laskowski | 250/561 |
| 4,810,088 | 3/1989 | Karning et al. | 356/5 |
| 4,902,887 | 2/1990 | Everett, Jr. | 250/221 |
| 5,006,721 | 4/1991 | Cameron et al. | 250/561 |
| 5,112,127 | 5/1992 | Carrabba et al. | 356/301 |

Primary Examiner—David C. Nelms
Attorney, Agent, or Firm—Alain L. Bashore; Milton W. Lee; Anthony T. Lane

[57] ABSTRACT

A near infrared illuminator for enhancing viewing of a target viewed with an infrared viewing device when the target falls within a predetermined range. A pulse generator generates a laser pulse in the near infrared with a pulse clock for control of laser brightness and a pulse frequency adjust for control of laser blink rate. The pulse is transmitted along an optical path at a specific brightness and blink rate to a target. A detector within the optical path detects a reflected infrared signal from the target and converts the signal to an electrical signal which is processed by a processor to obtain target range information. A trigger logic controls the pulse clock rate means whereby when the target range falls within a predetermined range the laser pulse rate is increased such that increased illumination of the target is viewable with an infrared viewing device.

4 Claims, 3 Drawing Sheets

ADJUSTABLE NEAR INFRARED RANGEFINDER ILLUMINATOR

BACKGROUND OF THE INVENTION

1. Field of the Invention

The present invention generally relates to infrared illuminators and more specifically, to near infrared illuminators with a rangefinding capability and infrared viewing enhancement.

2. Description of Prior Art

Near infrared (NIR) illuminators have been used in night vision technology to enhance viewing with an infrared viewing ($I^2$) device. Some of the types of illuminators in the prior art include those for: aiming, boresight alignment, object illumination, and cueing.

Two types of NIR illuminators involve the aiming and alignment of a weapon. A NIR illuminator referred to as an aiming light, emits from a weapon an infrared beam reflected off a target. An operator using an $I^2$ device (such as night vision goggles) using the aiming light will have sighted and thus "zeroed" on that target. Boresight alignment uses a NIR illuminator called a boresight light which is inserted into a boresight mechanism. This allows the operator, using night vision goggles, to observe the positions of, and thus align and position the boresight and aiming light.

When using night vision equipment it is often necessary to illuminate objects of interest with a NIR source when viewed with an $I^2$ device. In a surveillance situation the use of a NIR radiation source will illuminate a field of view. NIR retro-reflecting markers can be used to make specific location points visible in a field of view. NIR illuminators may also be used to illuminate an operator work space. Cueing involves using a NIR illuminator to alert an operator to an obstacle in ones path. A device or operator receives a reflection from an object in the path of the operator which is then used to take evasive action, which is commonly called terrain avoidance.

Each of the NIR illumination methods discussed above are deficient in that no information is obtained as to range. Range information is needed when using an aiming light because weapons are zeroed for a specific range and in terrain avoidance so that the operator can judge how much distance can be allowed to avoid what is in the path. Also, the above methods are of a fixed field of view so there is no simple way available for an operator to adjust the device to obtain more information without diverting from the object or target.

While the prior art has reported using NIR illuminators, none have established a basis for a specific method and apparatus that is dedicated to the task of resolving the particular problem at hand. What is needed in this instance is a NIR illuminator for infrared viewing enhancement rangefinding capability.

SUMMARY OF THE INVENTION

It is therefore the object of the invention to provide a NIR illuminator that includes a range finding capability for infrared viewing enhancement.

According to the invention, there is disclosed a NIR illuminator which includes range gate processing and an adjustable field of view. An operator utilizing an $I^2$ device would view the reflection of the illuminator. The operator sets a gate time which corresponds to a known range window. The time a transmitted pulse takes to hit a target and return is compared to the gate time which determines an alarm response. By adjusting the narrow band filter and GRIN (Gradient Index) lens, the field of view can be made adjustable allowing an operator to view a greater area. In the preferred embodiment, a pilot wearing night vision goggles would receive an aural/visual warning inside the cockpit and an increased illumination of an optical cue visible with night vision goggles from the external world.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
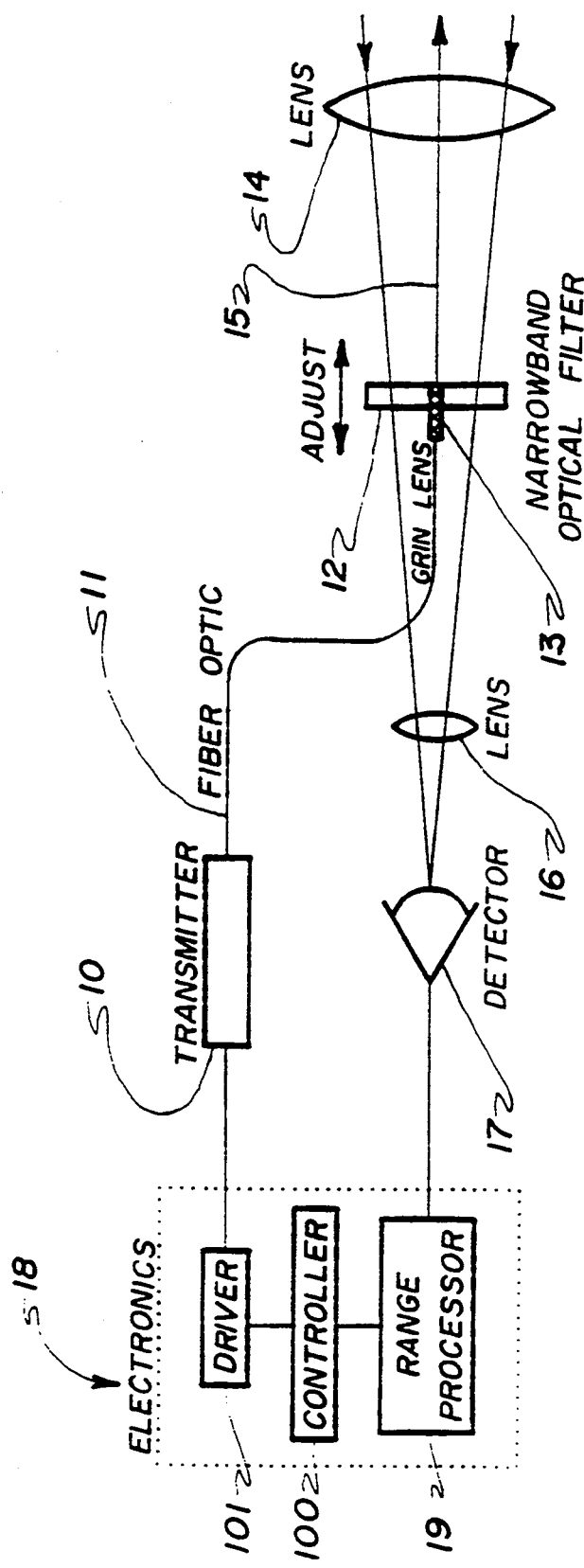
FIG. 1 is a diagram of the components for the present invention.

Referring now to the drawings, and more particularly to FIG. 1, there is shown in the diagram the components of the adjustable NIR illuminator. Optical transmitter 10 emits an optical pulse along fiber optic 11. The length of the pulse is 20 nsec or less in order to obtain adequate range resolution. The optical wavelength of the transmitter is selected to be compatible with the $I^2$ device's spectral response to view the illumination. The transmitted pulse is fed to the center of optical filter 12 via GRIN lens element 13, fixedly embedded into filter 12, and out lens 14 to the target. Optical filter 12 is a narrowband optical filter which is physically adjustable with GRIN lens 13 along optical path 15 to adjust the transmitted beam size and thus the illumination field of view.

Incoming light received back from a target through lens 14 the remainder of filter 12 is focused by detector lens 16 and fed into detector 17 which converts light to an electrical signal used by electronics 18. Beam divergence of the system is adjusted over a wide range (such as 1 mRad to 100 mRad) through positioning GRIN lens 13 and optical filter 12. Electronics 18 consist of a range processor 19 which processes range information fed to it by detector 17, a controller 100 that uses the range processor output, and driver 101 to drive transmitter 10. Range processor 19 utilizes an adjustable gate technique described with reference to FIG. 2.

Figure 2:
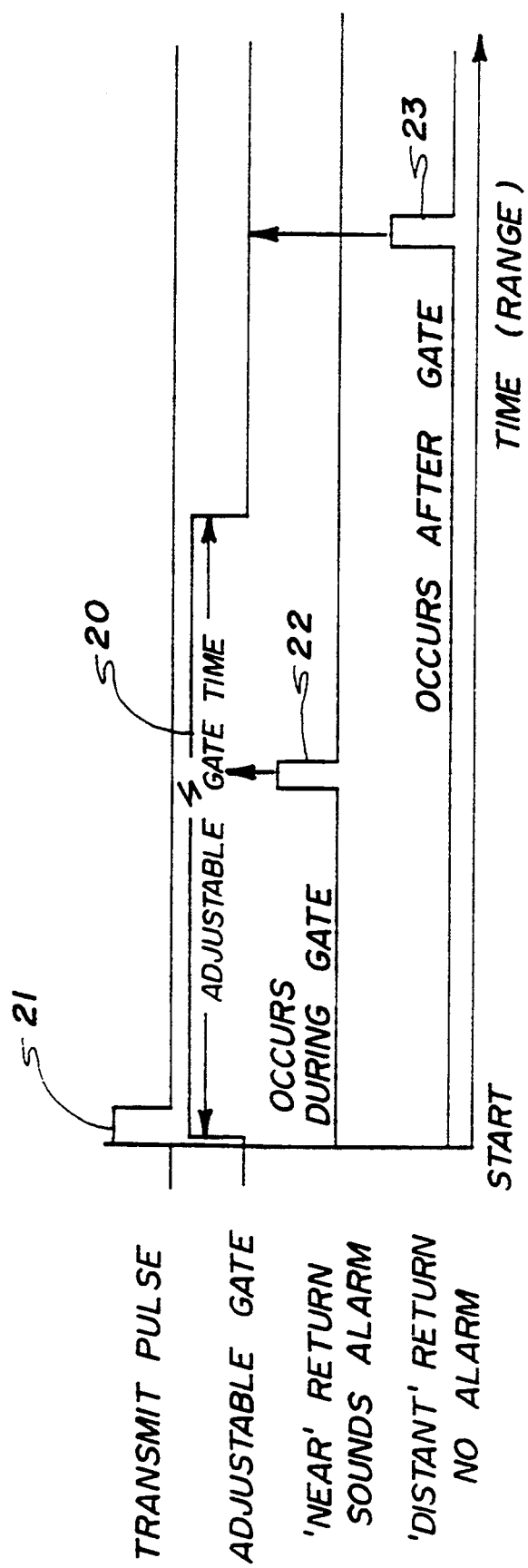
FIG. 2 is a pulse-time graph for range processing utilized by the present invention.

FIG. 2 shows a pulse-time graph depicting range processing for the present invention. Gate time 20 is set by a reference pulse width, selected by the user which corresponds to a known range window. The time it takes for transmitted pulse 21 to hit an object and return is compared to this gate time. If the gate time is larger such as return pulse 22, visual and aural alarms will be initiated indicating the return fell below the selected threshold. Return pulse 23 represents a return that fell outside the gate selected. The preferred embodiment utilized is an illuminator used in terrain avoidance for aircraft which is described next.

In the preferred embodiment, a pilot wearing night vision goggles would receive an aural/visual warning inside the cockpit and an optical cue (such as a spot) visible with night vision goggles as the illumination. The optical transmitter in the preferred embodiment is a short pulse transmitter which can be either a laser diode or a light-emitting diode. The detector in the preferred embodiment is either an avalanche photo-diode or a simple p-n junction diode. It is understood that the invention is not limited to the particular embodiment described below.

Figure 3:
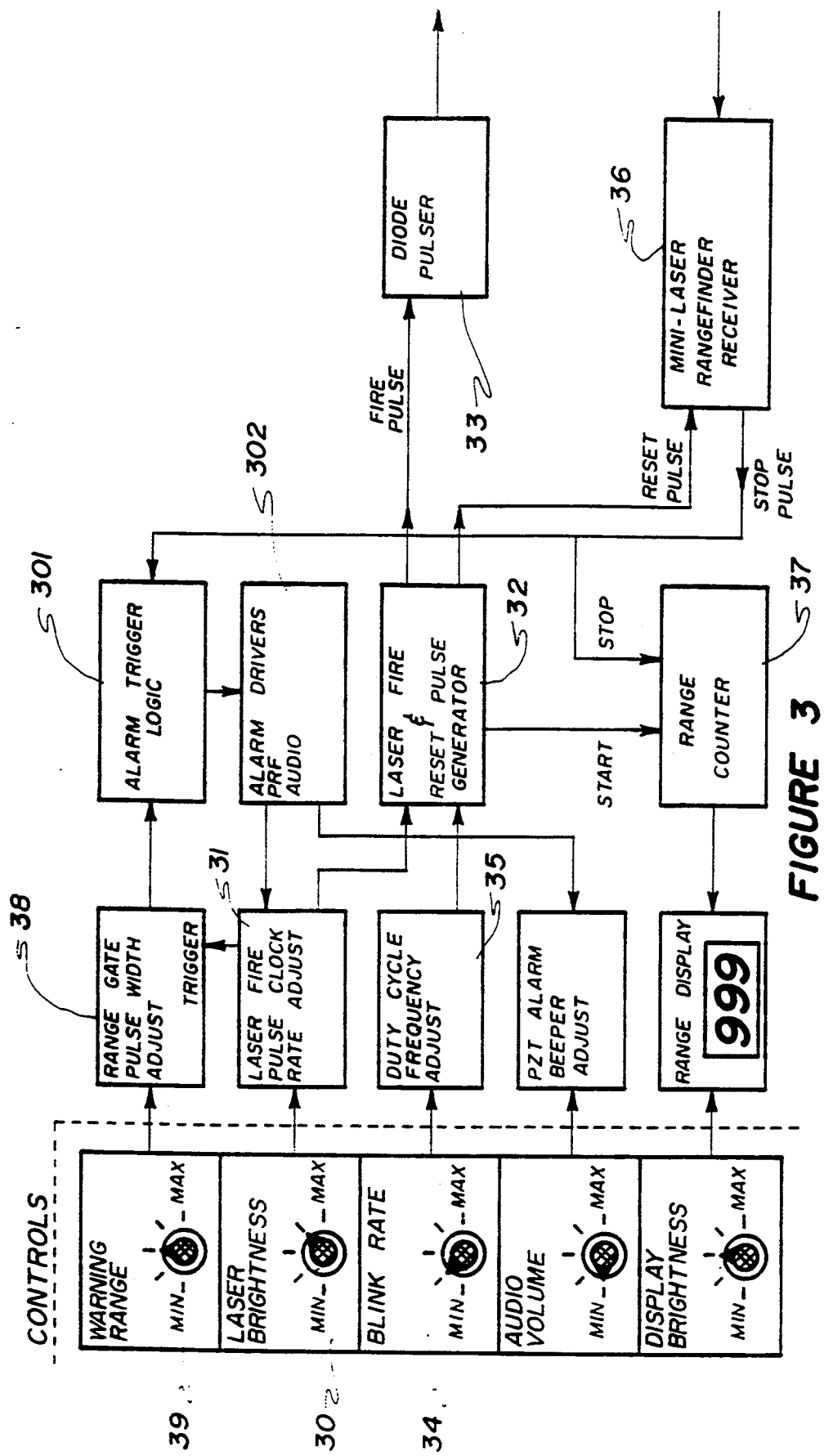
FIG. 3 is a block diagram of the electronics utilized in the preferred embodiment.

FIG. 3 shows the electronics utilized in the preferred embodiment. The pilot has control of the brightness of the spot as seen through the night vision goggles by adjusting laser brightness control 30 which controls laser fire pulse clock rate 31 which in turn controls laser fire & reset pulse generator 32 at a laser pulse repetition frequency preferrably between 200 and 800 Hz. Laser fire & reset pulse generator 32 produces bursts from diode pulser 33 with 50% duty cycle to give the pilot an illumination as a blinking spot to observe on the terrain. Blink rate-control 34 controls duty cycle frequency adjust 35 to adjust the blink rate over a range of less than one hertz to nearly twenty five hertz.

Range measurements are performed using only one pulse per burst in order to minimize incidents of false alarms. When a range measurement is to be made, a reset pulse is sent by laser fire & reset pulse generator 32 to the optical head of mini-laser rangefinder receiver 36. When a range measurement is to be made a reset pulse is sent to activate the optical head and a start pulse is sent to range counter 37 to begin the range measurement and a trigger pulse is sent to range gate pulse generator 38. The pilot controls the length of the gate pulse with warning range control 39 which determines the maximum distance at which a warning alarm will sound. If a stop pulse is received from the optical head of mini-laser rangefinder receiver 36 while the range gate pulse is "on", alarm trigger 301 will be activated which activate alarm audio 302.

When alarm audio 302 is activated the laser pulse rate is increased to the maximum allowed by eye-safety considerations (1700 Hertz) and the blinking spot is then observed by the pilot through night vision goggles at the increased rate. At the same time an audio alarm and LED on the control panel is turned on. The transmitted beam size is manually or automatically increased to a larger illumination field of view. The alarm mode lasts for one second and is immediately reactivated if the next range pulse triggers the alarm. Range counter 37 has five meter resolution and uses a green, gas florescent numerical display that is compatible with night vision goggles.

While this invention has been described in terms of preferred embodiment consisting of terrain avoidance, those skilled in the art will recognize that the invention can be practiced with modification within the spirit and scope of the appended claims.

Having thus described my invention, what we claim as new and desire to secure by Letters Patent is as follows:

1. A near infrared illuminator for enhancing viewing of a target viewed with an infrared viewing device when the target falls within a predetermined range, the illuminator including:

pulse generator means for generating a laser pulse in the near infrared;

pulse clock rate means for control of laser brightness;

pulse frequency means for control of laser blink rate;

pulse transmitting means for transmitting along an optical path a near infrared laser pulse at a specific brightness and blink rate to a target;

detector means within the optical path for detecting a reflected infrared signal from the target and converting the signal to an electrical signal;

processing means for processing the electrical signal to obtain target range information;

logic means for control of the pulse clock rate means whereby when the target range falls within a predetermined range the laser pulse rate is increased such that increased illumination of the target is viewable with an infrared viewing device.

2. The illuminator of claim 1 wherein the illuminator further includes:

adjusting means for adjusting the illumination field of view seen through the infrared viewing device.

3. A technique for enhancing viewing of a target viewed with an infrared viewing device when the target falls within a predetermined range, the technique including the steps of:

generating a laser pulse in the near infrared at a specified clock rate and frequency which determines respective laser brightness and blink rate;

transmitting along an optical path the near infrared laser pulse to a target;

detecting within the optical path a reflected infrared signal from the target and converting the signal to an electrical signal;

processing the electrical signal to obtain target range information;

determining if the target range falls within a predetermined range such that if the target range falls within the predetermined range the pulse clock rate is increased and the increased illumination of the target is viewable with an infrared viewing device.

4. The technique of claim 3 wherein the technique further includes the additional step of adjusting the field of view of the increased illumination.

* * * * *